(12) United States Patent
Nakahira et al.

(10) Patent No.: US 11,917,454 B2
(45) Date of Patent: Feb. 27, 2024

(54) WIRELESS COMMUNICATION METHOD AND BASE STATION

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 340 days.

(21) Appl. No.: 17/439,963

(22) PCT Filed: Mar. 11, 2020

(86) PCT No.: PCT/JP2020/010645
§ 371 (c)(1),
(2) Date: Sep. 16, 2021

(87) PCT Pub. No.: WO2020/195858
PCT Pub. Date: Oct. 1, 2020

(65) Prior Publication Data
US 2022/0232425 A1  Jul. 21, 2022

(30) Foreign Application Priority Data

Mar. 25, 2019  (JP) ................. 2019-057395

(51) Int. Cl.
*H04H 20/71* (2008.01)
*H04W 28/22* (2009.01)
*H04W 4/06* (2009.01)

(52) U.S. Cl.
CPC ............. *H04W 28/22* (2013.01); *H04W 4/06* (2013.01)

(58) Field of Classification Search
CPC ................................ H04W 28/22; H04W 4/06
See application file for complete search history.

(56) References Cited

U.S. PATENT DOCUMENTS 9,420,563 B2 * 8/2016 Futaki ................. H04W 52/327

OTHER PUBLICATIONS

IEEE Std 802.11ac-2013, Dec. 2013.
International Search Report issued in PCT/JP2020/010645, dated May 26, 2020.

* cited by examiner

*Primary Examiner* — Erika A Washington
(74) *Attorney, Agent, or Firm* — Harness, Dickey & Pierce, P.L.C.

(57) ABSTRACT

A wireless communications method for connecting a base station with each of a plurality of terminal stations, the base station being equipped with a plurality of wireless communications units configured to be able to select a plurality of different transmission rates and connectable with one or more of the terminal stations, includes: a collection step of collecting information about a transmission rate and multicast transmission frequency from each of the terminal stations; a policy calculation step of calculating a setting policy for setting a unicast transmission rate and a multicast transmission rate for each of the wireless communications units and a switching policy for setting a condition for switching that one of the wireless communications units which is to be connected, for each of the terminal stations based on the collected information; and a setting step of setting those of the terminal stations which are to be connected, for each of the wireless communications units based on the calculated setting policy and switching policy.

4 Claims, 10 Drawing Sheets

Fig. 4

| CLASS | TRANSMISSION RATE | FREQUENCY OF MULTICAST TRANSMISSION |
|---|---|---|
| A | 100Mbps | LOW |
| B | 200Mbps | LOW |
| C | 200Mbps | HIGH |
| D | 300Mbps | HIGH |

Fig. 8

| CLASS | TRANSMISSION RATE | FREQUENCY OF MULTICAST TRANSMISSION | SETTING POLICY |
|---|---|---|---|
| A | 100Mbps | LOW | POLICY X1 |
| B | 200Mbps | LOW | |
| C | 300Mbps | HIGH | POLICY X2 |
| D | 400Mbps | HIGH | |

Fig. 9

| | | SWITCHING POLICY |
|---|---|---|
| FIRST TERMINAL STATION 10 | CLASS A | POLICY Y1 |
| SECOND TERMINAL STATION 20 | CLASS B | |
| THIRD TERMINAL STATION 30 | CLASS C | POLICY Y2 |
| FOURTH TERMINAL STATION 40 | CLASS D | |

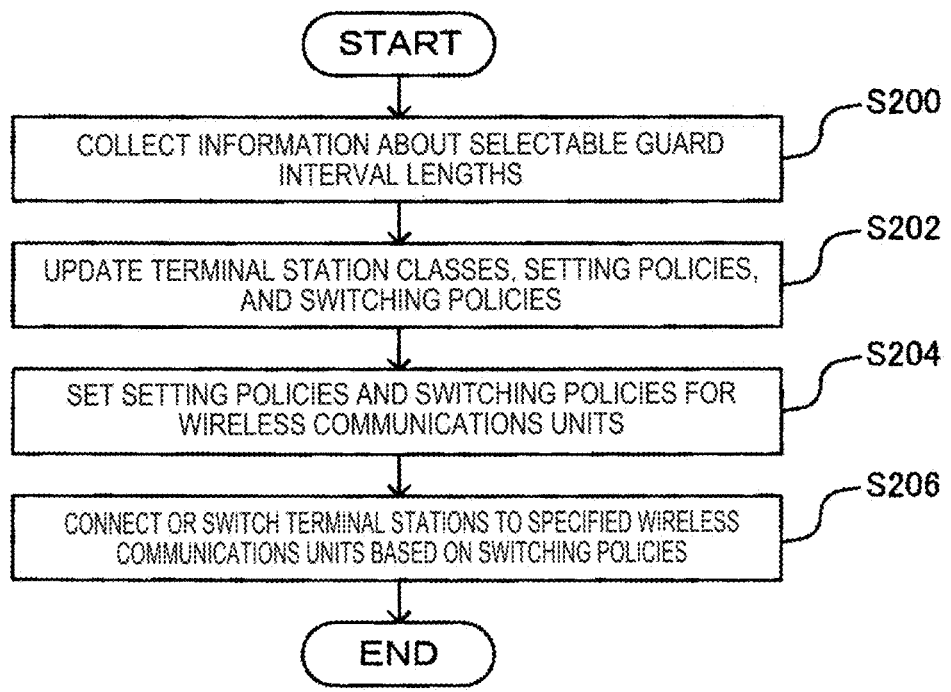

WIRELESS COMMUNICATION METHOD AND BASE STATION

CROSS-REFERENCE TO RELATED APPLICATIONS

This application is a 371 U.S. National Phase of International Application No. PCT/JP2020/010645, filed on Mar. 11, 2020, which claims priority to Japanese Application No. 2019-057395, filed on Mar. 25, 2019. The entire disclosures of the above applications are incorporated herein by reference.

TECHNICAL FIELD

The present invention relates to a wireless communication method and base station.

BACKGROUND ART

High-speed radio access systems that use radio waves in the 5-GHz band include wireless LANs based on IEEE 802.11a, 11n, and 11ac standards. With the 11a standard, a transmission rate of up to 54 Mbit/s is achieved by stabilizing characteristics in a multipath fading environment based on orthogonal frequency division multiplexing (OFDM) modulation scheme. Furthermore, with the 11n standard, a transmission rate of up to 600 Mbit/s is achieved using MIMO (Multiple Input Multiple Output) or channel bonding technology, where the MIMO technology implements space-division multiplexing on the same radio channel using plural antennas while the channel bonding technology implements a 40-MHz frequency channel using two 20-MHz frequency channels simultaneously.

Besides, with the 11ac standard, wireless communications higher in speed and efficiency than the 11n standard are implemented by means of channel bonding technology that realizes a frequency channel for up to 160 MHz using up to eight 20-MHz frequency channels simultaneously, downlink multi-user MIMO technology that simultaneously transmits different signals to multiple destinations on the same channel, or other technology (see, for example, Non-Patent Literature 1).

At present, an IEEE802.11ax standard that focuses on improvement of transmission efficiency in addition to improvement of transmission rate is being worked out. With the 11ax standard, promotion of spatial frequency reuse by means of simultaneous transmission and efficiency improvement of the OFDM modulation scheme as well as uplink and downlink OFDMA transmission and uplink multi-user MIMO transmission in terms of multi-user transmission are expected to become available for use.

Also, it is known that the wireless LAN has a multicast transmission function to implement video streaming to plural terminal stations. The multicast transmission, which can transmit the same data to multiple terminal stations simultaneously, enables more efficient data transmission than unicast transmission, which transmits data individually.

CITATION LIST

Non-Patent Literature

Non-Patent Literature 1: IEEE Std 802.11ac-2013, December 2013

SUMMARY OF THE INVENTION

Technical Problem

However, in the case of transmission to all the terminal stations connected to a base station, the transmission rate of multicast transmission is set to the lowest transmission rate of the terminal stations. Therefore, if there is a terminal station with a very low transmission rate among the terminal stations, the transmission efficiency of the multicast transmission is reduced greatly.

An object of the present invention is to provide a wireless communications method and base station that can improve the transmission efficiency of multicast transmission even if there is a terminal station with a low transmission rate among plural terminal stations.

Means for Solving the Problem

According to one aspect of the present invention, there is provided a wireless communications method for connecting a base station with each of a plurality of terminal stations, the base station being equipped with a plurality of wireless communications units configured to be able to select a plurality of different transmission rates and connectable with one or more of the terminal stations, the method comprising: a collection step of collecting information about a transmission rate and multicast transmission frequency from each of the terminal stations; a policy calculation step of calculating a setting policy for setting a unicast transmission rate and a multicast transmission rate for each of the wireless communications units and a switching policy for setting a condition for switching that one of the wireless communications units which is to be connected, for each of the terminal stations, based on the collected information; and a setting step of setting those of the terminal stations which are to be connected, for each of the wireless communications units based on the calculated setting policy and switching policy.

Also, according to another aspect of the present invention, in the wireless communications method, transmission rates are set on the wireless communications units according to a minimum transmission rate of unicast transmission and usage frequency of multicast transmission.

Also, according to another aspect of the present invention, there is provided a base station connected with each of a plurality of terminal stations, the base station comprising: a plurality of wireless communications units configured to be able to select a plurality of different transmission rates and connectable with one or more of the terminal stations; a collection unit configured to collect information about a transmission rate and multicast transmission frequency from each of the terminal stations; a policy calculation unit configured to calculate a setting policy for setting a unicast transmission rate and a multicast transmission rate for each of the wireless communications units and a switching policy for setting a condition for switching that one of the wireless communications units which is to be connected, for each of the terminal stations, based on the information collected by the collection unit; and a setting unit configured to set those of the terminal stations which are to be connected, for each of the wireless communications units based on the setting policy and switching policy calculated by the policy calculation unit.

Also, according to another aspect of the present invention, in the base station, transmission rates are set on the wireless communications units according to a minimum transmission rate of unicast transmission and usage frequency of multicast transmission.

Effects of the Invention

The present invention can improve the transmission efficiency of multicast transmission even if there is a terminal station with a low transmission rate among plural terminal stations.

BRIEF DESCRIPTION OF DRAWINGS

FIG. 4 is a table showing exemplary classes of terminal stations in a wireless communications system.

FIG. 8 is a table showing a relationship between the class of terminal stations and setting policy.

FIG. 9 is a table showing a relationship between the class of terminal stations and switching policy.

FIG. 10 is a flowchart showing a second operation example of the base station that uses the setting policy and switching policy.

DESCRIPTION OF EMBODIMENTS

Figure 1:
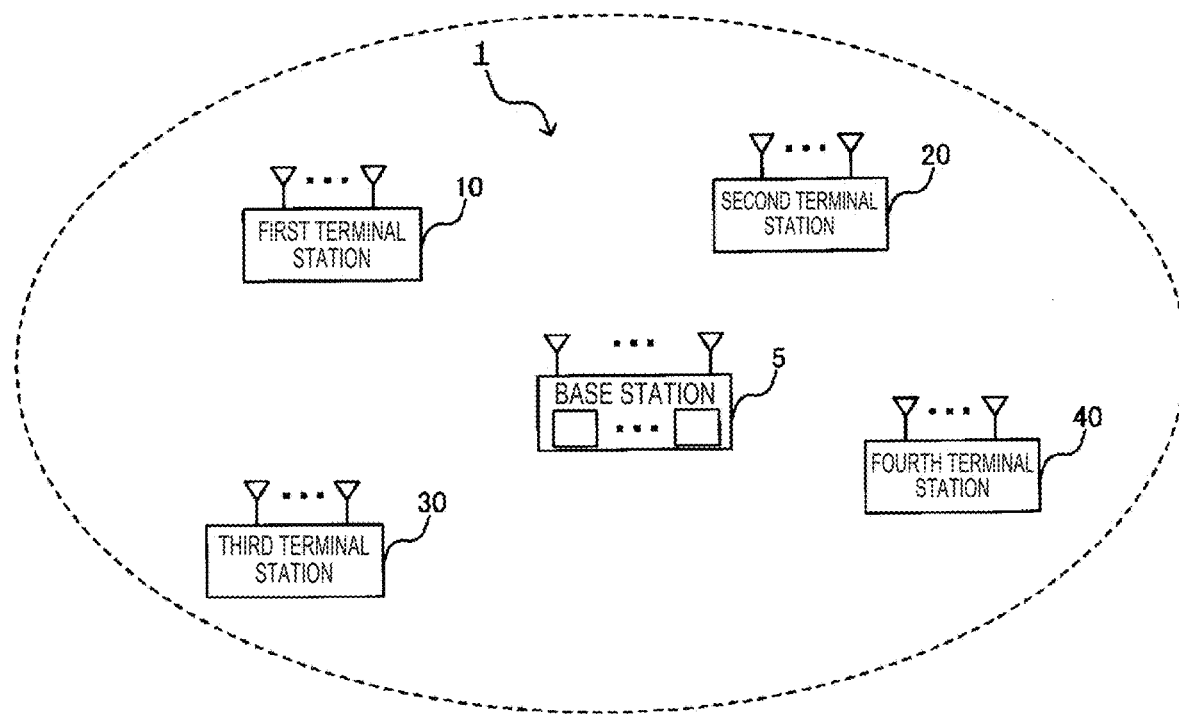
FIG. 1 is a diagram showing a configuration example of a wireless communications system according to an embodiment.

An embodiment of a wireless communications system will be described below with reference to the drawings. FIG. 1 shows a configuration example of a wireless communications system 1 according to the embodiment. As shown in FIG. 1, the wireless communications system 1 includes, for example, a base station 5, and a first terminal station 10, a second terminal station 20, a third terminal station 30, and a fourth terminal station 40 existing in a service area, which is an area in which communications can be conducted with the base station 5.

Here, the first terminal station 10, second terminal station 20, third terminal station 30, and fourth terminal station 40 differ from one another in class including transmission rate (see FIG. 4). Also, plural terminal stations equal in transmission rate to the first terminal station 10, second terminal station 20, third terminal station 30, and fourth terminal station 40, respectively, may exist in the service area of the base station 5.

Figure 2:
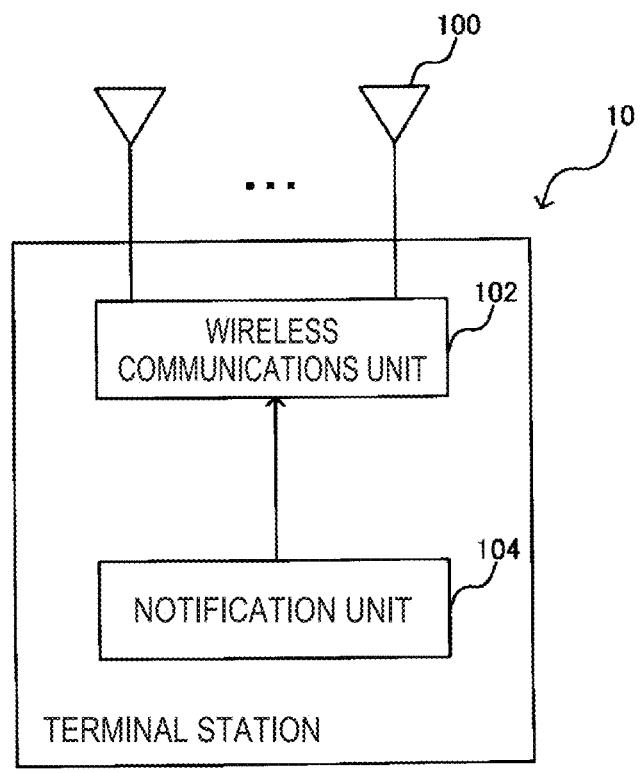
FIG. 2 is a diagram showing a configuration example of a first terminal station.

FIG. 2 shows a configuration example of the first terminal station 10. As shown in FIG. 2, the first terminal station 10 includes plural antennas 100, a wireless communications unit 102, and a notification unit 104. Note that other functional blocks which terminal stations are typically equipped with are not illustrated.

The antennas 100 are connected to the wireless communications unit 102, transmit radio frames inputted from the wireless communications unit 102, and outputs received radio frames to the wireless communications unit 102.

The wireless communications unit 102 converts information inputted, for example, from the notification unit 104 into radio frames, and outputs the radio frames to the antenna 100.

The notification unit 104 outputs information indicating wireless communications standards and communications schemes supported by the first terminal station 10 to the wireless communications unit 102.

Note that the second terminal station 20, third terminal station 30, and fourth terminal station 40 have configuration substantially equal to the first terminal station 10, but each differs from the first terminal station 10 in class including transmission rate.

Figure 3:
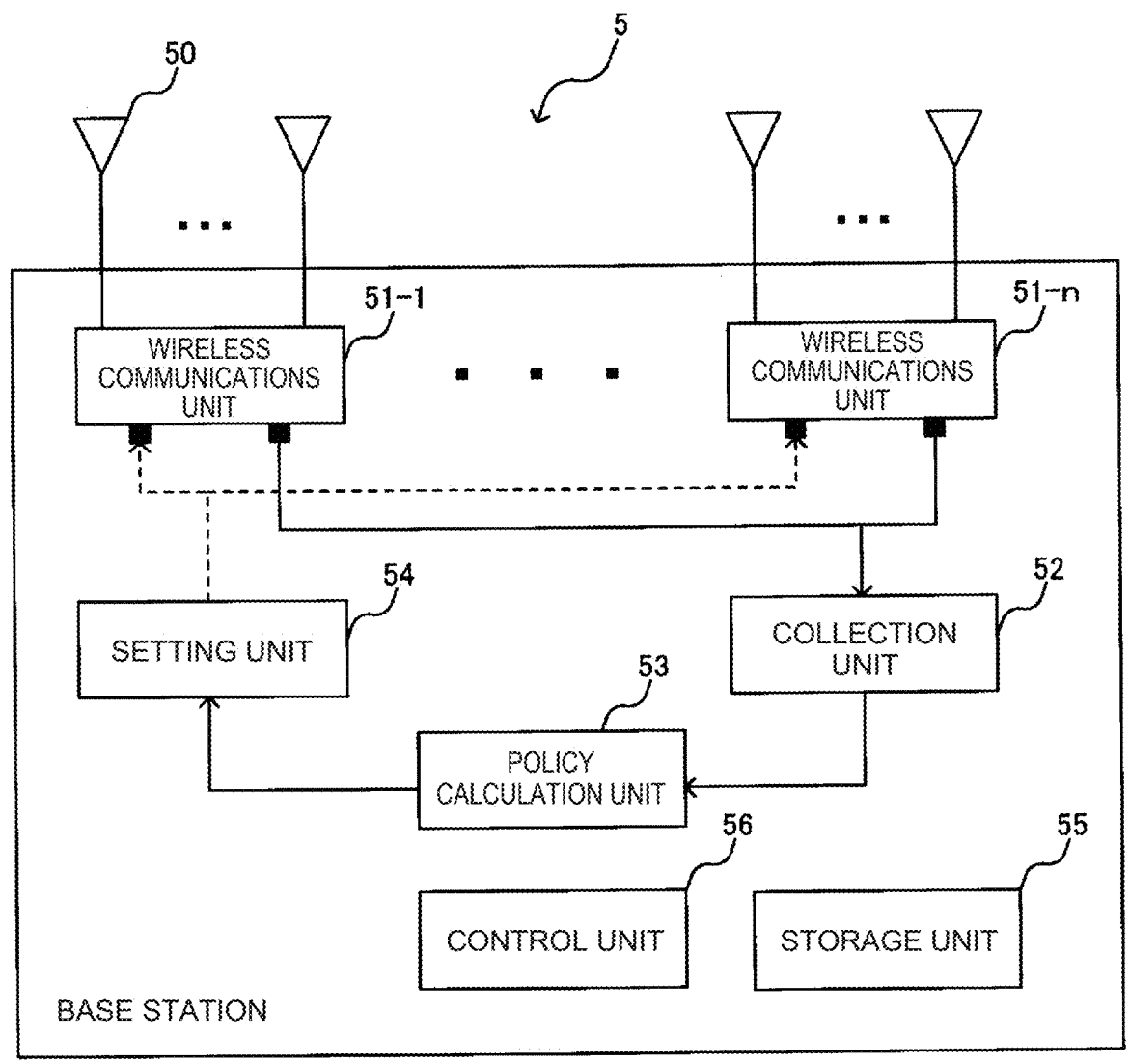
FIG. 3 is a diagram showing a configuration example of a base station according to the embodiment.

FIG. 3 shows a configuration example of the base station 5 according to the embodiment. As shown in FIG. 3, the base station 5 includes, for example, plural antennas 50, n wireless communications units 51-1 to 51-$n$, a collection unit 52, a policy calculation unit 53, a setting unit 54, a storage unit 55, and a control unit 56. Note that other functional blocks which base stations are typically equipped with are not illustrated.

Plural antennas 50 are connected to each of the wireless communications units 51-1 to 51-$n$ and transmit wireless frames received from the connected wireless communications units 51-1 to 51-$n$ and output the received wireless frames to the other wireless communications units 51-1 to 51-$n$.

Each of the wireless communications units 51-1 to 51-$n$ is configured to be able to conduct wireless communications independently of one another, with one or more terminal stations (e.g., at least one of the first terminal station 10, second terminal station 20, third terminal station 30, and fourth terminal station 40), for example, via plural antennas 50. Also, the wireless communications units 51-1 to 51-$n$, which are configured to be able to select plural different transmission rates, conduct communications with plural terminal stations using unicast transmission rates and multicast transmission rates set for the respective wireless communications units. For example, the transmission rate may be set on the wireless communications units 51-1 to 51-$n$ according to a minimum transmission rate of unicast transmission and usage frequency of multicast transmission with respect to the terminal stations.

The collection unit 52 collects information about a transmission rate and multicast transmission frequency of each of the terminal stations as well as connection information about the terminal stations from the wireless communications units 51-1 to 51-$n$, and lists and outputs the collected information to the policy calculation unit 53. For example, as the connection information about the terminal stations, the collection unit 52 collects the number of connected terminal stations, class of each terminal station, and estimated traffic volume regarding each of the wireless communications units 51-1 to 51-$n$.

Based on the information received from the collection unit 52, i.e., the information about the transmission rate and multicast transmission frequency of each of the terminal stations as well as the connection information about the terminal stations, the policy calculation unit 53 calculates the two policies described below and outputs the policies to the setting unit 54. The first of the policies is a setting policy about standards or communications schemes set for the wireless communications units 51-1 to **51-*n*, respectively. The second of the policies is a switching policy for determining which of the wireless communications units 51-1 to 51-*n* each of the terminal stations is to be connected to. For example, the setting policy includes setting the unicast transmission rate and multicast transmission rate for each of the wireless communications units 51-1 to 51-*n*. Also, the switching policy includes setting a condition for switching that one of the wireless communications units 51-1 to 51-*n*** which is to be connected, for each of the terminal stations.

For each of the wireless communications units 51-1 to **51-*n*, the setting unit 54 sets the setting policy for setting the unicast transmission rate and multicast transmission rate as well as the switching policy for determining which of the wireless communications units 51-1 to 51-*n* each of the terminal stations is to be connected to. That is, based on the setting policy and switching policy calculated by the policy calculation unit 53, the setting unit 54 sets the terminal station to be connected for each of the wireless communications units 51-1 to 51-*n***.

The storage unit 55 stores, for example, information and the like collected by the collection unit 52. The control unit 56, which includes a no-illustrated CPU and memory, controls various parts of the base station 5.

Thus, the wireless communications units 51-1 to **51-*n* conduct wireless communications independently of one another, with some of the first terminal station 10, second terminal station 20, third terminal station 30, and fourth terminal station 40, based on the setting policy for the unicast transmission rate and multicast transmission rate, the setting policy having been set by the setting unit 54. That is, the wireless communications system 1 is made up of the base station 5 connected with the first terminal station 10, second terminal station 20, third terminal station 30, and fourth terminal station 40 set to differ in unicast transmission rate and multicast transmission rate, where the base station 5 is equipped with plural wireless communications units 51-1 to 51-*n*** each configured to be connectable with one or more of the terminal stations.

Then, the wireless communications units 51-1 to **51-*n* switches connection of the first terminal station 10, second terminal station 20, third terminal station 30, and fourth terminal station 40 based on the switching policy about connectable terminal stations, the switching policy being set by the setting unit 54. Also, the setting policy and switching policy for the wireless communications units 51-1 to 51-*n* are updated when the setting policy and switching policy calculated by the policy calculation unit 53 based on the information collected by the collection unit 52 are set by the setting unit 54**.

Next, a concrete operation example of the wireless communications system 1 will be described.

FIG. 4 shows exemplary classes of terminal stations in the wireless communications system 1. In the table shown in FIG. 4, the first column shows classes of terminal stations, and it is assumed here that the classes are A, B, C, and D. The second column shows the transmission rate used by terminal stations for unicast transmission. The third column shows the usage frequency of multicast transmission.

Here, the first terminal station 10 shown in FIG. 1 belongs to class A, the second terminal station 20 belongs to class B, the third terminal station 30 belongs to class C, and the fourth terminal station 40 belongs to class D.

Settings appropriate to the classes of the corresponding terminal stations are made on the wireless communications units 51-1 to **51-*n* of the base station 5. At least one of the wireless communications units 51-1 to 51-*n* is set to the lowest transmission rate for multicast transmission to support various classes of terminal stations. Therefore, the first terminal station 10, second terminal station 20, third terminal station 30, and fourth terminal station 40 are configured to be connectable to one of the wireless communications units 51-1 to 51-*n* of the base station 5** regardless of their classes.

Figure 5:
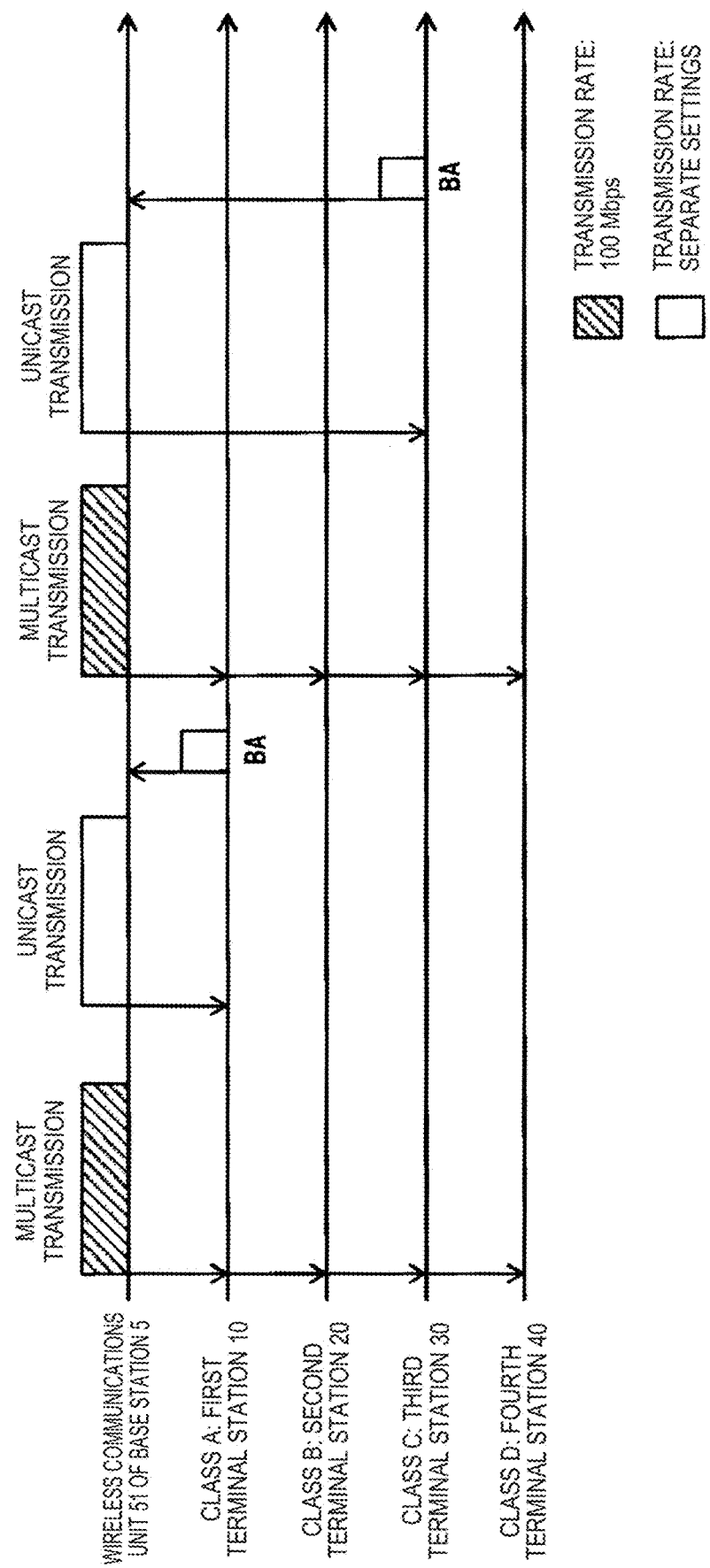
FIG. 5 is a diagram showing a communications example in which plural classes of terminal stations are accommodated in a wireless communications unit.

FIG. 5 shows a communications example in which plural classes of terminal stations are accommodated by any one (hereinafter referred to simply as the wireless communications unit 51) of the wireless communications units 51-1 to **51-*n*. As shown in FIG. 5**, in multicast transmission, transmission with all the terminals are carried out at a minimum transmission rate of 100 Mbps. However, regarding terminal stations that do not need multicast transmission, the frame is deleted. Also, in unicast transmission, which is individual transmission, the transmission rate is set individually for each terminal station.

In this way, in multicast transmission, the minimum transmission rate is set and used for transmission, and consequently there are cases in which the transmission efficiency is not maximized.

Figure 6:
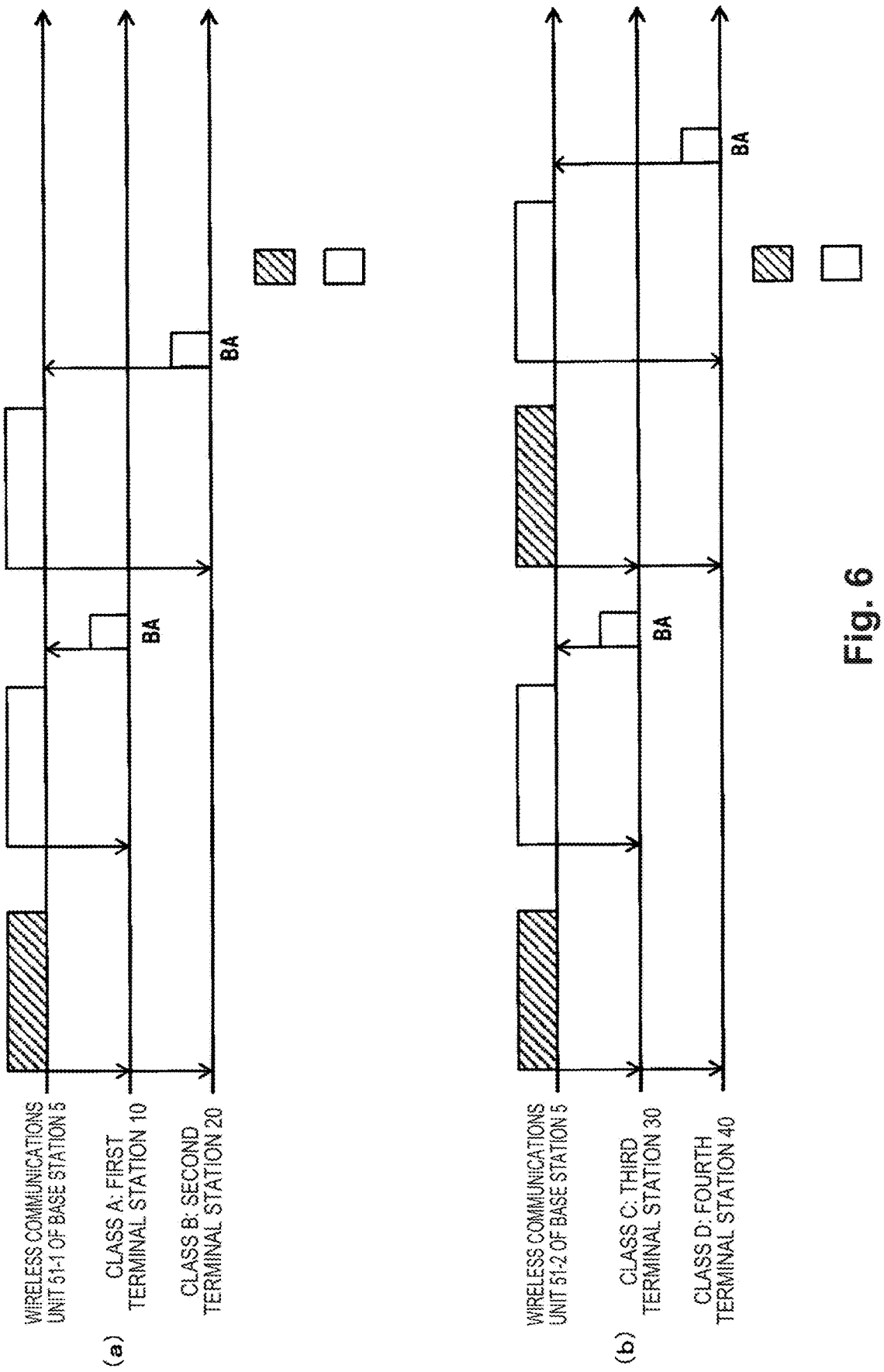
FIG. 6(a) is a diagram showing a communications example in which a first terminal station of class A and a second terminal station of class B are connected to a wireless communications unit of the base station and FIG. 6(b) is a diagram showing a communications example in which a third terminal station of class C and a fourth terminal station of class D are connected to a wireless communications unit of the base station.

FIGS. 6(*a*) and 6(*b*) show examples in which terminal stations are accommodated on a class by class basis by one of different wireless communications units 51-1 to **51-*n*. FIG. 6**(*a*) shows a communications example in which a first terminal station 10 of class A and second terminal station 20 of class B are connected to the wireless communications unit 51-1 of the base station 5. FIG. 6(*b*) shows a communications example in which a third terminal station 30 of class C and a fourth terminal station 40 of class D are connected the wireless communications unit 51-2 of the base station 5.

In the example shown in FIG. 6(*a*), on the wireless communications unit 51-1, the transmission rate for multicast transmission is 100 Mbps and the usage frequency of multicast transmission is low, resulting in a reduced number of transmissions by multicast transmission as well.

In the example shown in FIG. 6(*b*), on the wireless communications unit 51-2, the transmission rate for multicast transmission is 200 Mbps and the usage frequency of multicast transmission is high, resulting in an increased number of transmissions by multicast transmission as well.

In this way, in order to increase the transmission efficiency of terminal stations, desirably the wireless communications system 1 classifies the terminal stations according to the usage frequency of multicast transmission and the transmission rates of the terminal stations and accommodates the terminal stations by plural different wireless communications units 51 established according to the classification.

For that, the setting unit 54 sets the setting policy and switching policy for each of the wireless communications units 51-1 to **51-*n*, where the setting policy is worked out according to the transmission rates of the terminal stations connected to the base station 5 and the usage frequency of multicast transmission while the switching policy is used to determine the wireless communications units 51-1 to 51-*n*** to be connected with the terminal stations.

For example, both the second terminal station 20 of class B and third terminal station 30 of class C can communicate at a transmission rate of 200 Mbps. However, the second terminal station 20 with a low usage frequency of multicast transmission is connected to the wireless communications unit 51-1 with a multicast transmission rate of 100 Mbps and the third terminal station 30 with a high usage frequency of multicast transmission is connected to the wireless communications unit 51-2 with a multicast transmission rate of 200 Mbps.

Figure 7:
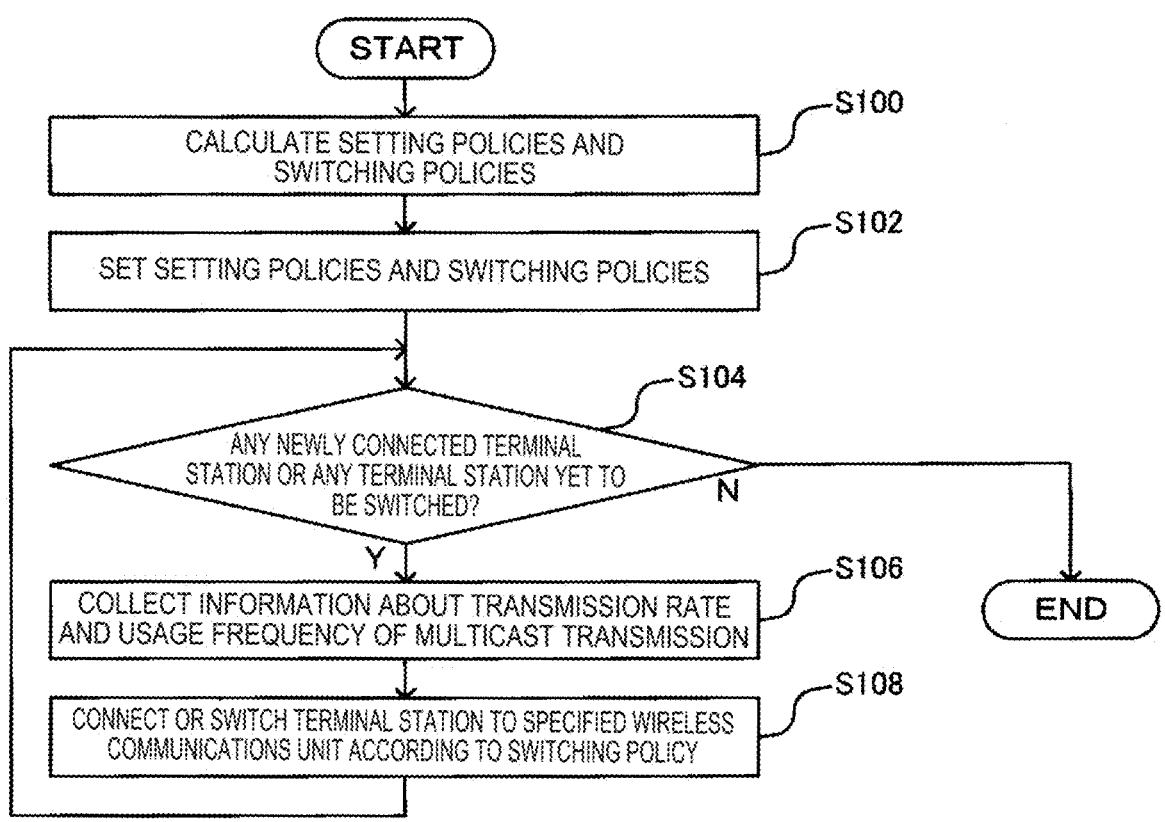
FIG. 7 is a flowchart showing a first operation example of a base station that uses a setting policy and switching policy.

FIG. 7 is a flowchart showing a first operation example of the base station 5 that uses the setting policy and switching policy. The policy calculation unit 53 of the base station 5 (FIG. 3) calculates the setting policies and switching policies for the classes of the terminal stations (S100).

Specifically, based on the information collected by the collection unit 52, or the preset number of connected terminal stations, class of each terminal station, and estimated traffic volume, the policy calculation unit 53 calculates predicted throughputs available when combinations of all or part of setting policies and switching policies are applied and selects the setting policy and switching policy that will maximize the predicted throughput, as calculation results.

Then, the setting unit 54 sets setting policies and switching policies for the wireless communications units 51-1 to 51-n, the setting policies and switching policies having been calculated by the policy calculation unit 53 for the respective classes of the terminal stations (S102). The processes of S100 and S102 are default processes of the base station 5.

Next, the collection unit 52 determines whether there is any newly connected terminal station or any terminal station yet to be switched (S104). If there is no newly connected terminal station or terminal station yet to be switched, the processing is finished. If there is any newly connected terminal station or any terminal station yet to be switched, the flow goes to the process of S106.

In the process of S106, the collection unit 52 collects information about the transmission rate and usage frequency of multicast transmission of each of the terminal stations.

Then, according to the switching policy calculated by the policy calculation unit 53, the setting unit 54 connects or switches the terminal station to a specified wireless communications unit 51 (S108). Then, the base station 5 returns to the process of S104 and repeats the process until there is no longer any newly connected terminal station or terminal station yet to be switched.

Note that the determination in the process of S104 as to whether there is any newly connected terminal station or any terminal station yet to be switched may be made by the control unit 56 based, for example, on a state, stored in the storage unit 55, as to how the processes of S106 and S108 are carried out on each of the terminal stations.

Also, concrete switching methods for switching the connection destination of the terminal station from the current wireless communications unit 51 to another wireless communications unit 51 include the following method. For example, there is a method whereby the base station 5 cuts wireless connection with the terminal station by transmitting a deauthentication frame or disassociation frame and ignores or rejects a reconnect request to any wireless communications unit 51 other than the wireless communications unit 51 that is to become the connection destination after the switching. Also, if a connect request from a terminal station is not directed at the wireless communications unit 51 specified (set) by the setting policy and switching policy, the base station 5 may instruct the terminal station to reconnect to the specified wireless communications unit 51.

In this way, since the wireless communications units 51 to be connected with terminal stations are determined based on the setting policy and switching policy, the wireless communications system 1 can improve transmission efficiency compared to a conventional wireless communications system in which terminal stations select and connect to wireless communications units at random.

Next, relationships between the setting policy/switching policy and operation of the base station 5 will be described with reference to FIGS. 8 and 9.

FIG. 8 shows a relationship between the class of terminal stations and setting policy. FIG. 9 shows a relationship between the class of terminal stations and switching policy. As shown in FIGS. 8 and 9, suppose, for example, settings corresponding to class A and class B of terminal stations are setting policy X1 and switching policy Y1, and settings corresponding to class C and class D of terminal stations are setting policy X2 and switching policy Y2. Although the combination of classes classified by the setting policy and the combination of classes classified by the switching policy are identical here, the combinations may differ from each other.

In the example shown in FIGS. 8 and 9, the base station 5 sets the setting policy X1 and switching policy Y1, for example, for the wireless communications unit 51-1 and performs control such that the first terminal station 10 of class A and second terminal station 20 of class B will be connected to the wireless communications unit 51-1.

In so doing, suppose the third terminal station 30 of class C is connected to the wireless communications unit 51-1, according to the switching policy Y2, the base station 5 switches the connection destination of the third terminal station 30, for example, to the wireless communications unit 51-2 in which the setting policy X2 for accommodating terminal stations of class C has been set up.

Also, the base station 5 sets the setting policy X2 and switching policy Y2, for example, for the wireless communications unit 51-2 and performs control such that the third terminal station 30 of class C and fourth terminal station 40 of class D will be connected to the wireless communications unit 51-2.

In so doing, suppose the wireless communications unit 51-2 is connected with the first terminal station 10 of class A, according to the switching policy Y1, the base station 5 switches the connection destination of the first terminal station 10, for example, to the wireless communications unit 51-1 in which the setting policy X1 for accommodating terminal stations of class A has been set up.

FIG. 10 is a flowchart showing a second operation example of the base station 5 that uses the setting policy and switching policy.

First, the collection unit 52 of the base station 5 (FIG. 3) collects information about the transmission rate and usage frequency of multicast transmission from each of the terminal stations (S200).

Next, if it is found necessary to update the terminal station classes, setting policies, or switching policies based on the information collected by the collection unit 52, the policy calculation unit 53 of the base station 5 newly calculates the setting policies and switching policies for the terminal station classes and thereby updates the setting policies and switching policies (S202). For example, if the throughput falls below a threshold, the policy calculation unit 53 newly calculates the setting policies and switching policies.

The setting unit 54 sets the newly calculated setting policies and switching policies for the wireless communications units 51-1 to 51-n, the setting policies and switching policies having been newly calculated for the terminal station classes by the policy calculation unit 53 (S204). For example, if any of the terminal station classes, setting policies, and switching policies have been updated by the policy calculation unit 53, the setting unit 54 sets updated contents for the wireless communications units 51-1 to 51-n.

Then, based on the switching policies newly set by the setting unit 54, the base station 5 connects or switches the terminal stations to specified wireless communications units 51 (S206).

Note that the collection unit 52, policy calculation unit 53, setting unit 54, and the like provided on the base station 5 of the present invention can be implemented by a computer and programs, where the programs can be recorded on a recording medium or provided via a network.

REFERENCE SIGNS LIST

1 Wireless communications system
5 Base station
10 First terminal station
20 Second terminal station
30 Third terminal station
40 Fourth terminal station
102 Wireless communications unit
104 Notification unit
50 Antenna
51-1 to 51-*n* Wireless communications unit
52 Collection unit
53 Policy calculation unit
54 Setting unit
55 Storage unit
56 Control unit

The invention claimed is:

1. A wireless communication method for connecting a base station with each of a plurality of terminal stations, the base station being equipped with a plurality of wireless communications units configured to be able to select a plurality of different transmission rates and connectable with one or more of the terminal stations, the method comprising:

a collection step of collecting information about a transmission rate and multicast transmission frequency from each of the terminal stations;

a policy calculation step of calculating a setting policy for setting a unicast transmission rate and a multicast transmission rate for each of the wireless communications units and a switching policy for setting a condition for switching that one of the wireless communications units which is to be connected, for each of the terminal stations based on the collected information; and a setting step of setting those of the terminal stations which are to be connected, for each of the wireless communications units based on the calculated setting policy and switching policy.

2. The wireless communication method according to claim 1, wherein transmission rates are set on the wireless communications units according to a minimum transmission rate of unicast transmission and usage frequency of multicast transmission.

3. A base station connected with each of a plurality of terminal stations, the base station comprising:

a plurality of wireless communications units configured to be able to select a plurality of different transmission rates and connectable with one or more of the terminal stations;

a collection unit configured to collect information about a transmission rate and multicast transmission frequency from each of the terminal stations;

a policy calculation unit configured to calculate a setting policy for setting a unicast transmission rate and a multicast transmission rate for each of the wireless communications units and a switching policy for setting a condition for switching that one of the wireless communications units which is to be connected, for each of the terminal stations, based on the information collected by the collection unit; and a setting unit configured to set those of the terminal stations which are to be connected, for each of the wireless communications units based on the setting policy and switching policy calculated by the policy calculation unit.

4. The base station according to claim 3, wherein transmission rates are set on the wireless communications units according to a minimum transmission rate of unicast transmission and usage frequency of multicast transmission.

* * * * *